(12) United States Patent
Lytle et al.

(10) Patent No.: US 10,782,514 B2
(45) Date of Patent: Sep. 22, 2020

(54) SYSTEMS AND METHODS FOR CALIBRATING A STRUCTURED ILLUMINATION IMAGING SYSTEM AND FOR CAPTURING A STRUCTURED ILLUMINATION IMAGE

(71) Applicant: LIFE TECHNOLOGIES CORPORATION, Carlsbad, CA (US)

(72) Inventors: Steven Lytle, Kirkland, WA (US); Paul Boeschoten, Redmond, WA (US); Andrew Gunderson, Bothell, WA (US); Larry Rystrom, Mill Creek, WA (US); Chris Gnehm, Bothell, WA (US)

(73) Assignee: Life Technologies Corporation, Carlsbad, CA (US)

( * ) Notice: Subject to any disclaimer, the term of this patent is extended or adjusted under 35 U.S.C. 154(b) by 44 days.

(21) Appl. No.: 15/826,125

(22) Filed: Nov. 29, 2017

(65) Prior Publication Data

US 2018/0157022 A1 Jun. 7, 2018

Related U.S. Application Data

(63) Continuation of application No. PCT/US2016/031570, filed on May 10, 2016.
(Continued)

(51) Int. Cl.
*G02B 21/00* (2006.01)
*G01N 21/27* (2006.01)
*G01N 21/64* (2006.01)

(52) U.S. Cl.
CPC ....... *G02B 21/0076* (2013.01); *G01N 21/274* (2013.01); *G01N 21/6458* (2013.01);
(Continued)

(58) Field of Classification Search
CPC ............ G02B 21/0032; G02B 21/0036; G02B 21/0044; G02B 21/0076; G01N 21/274
(Continued)

(56) References Cited

U.S. PATENT DOCUMENTS 5,900,949 A * 5/1999 Sampas ............... G02B 21/0076
348/E3.021
6,248,988 B1 * 6/2001 Krantz ................. G02B 21/004
250/201.3
(Continued)

FOREIGN PATENT DOCUMENTS

CN 104040590 9/2014
JP 2008-541144 11/2008
(Continued)

OTHER PUBLICATIONS

PCT/US2016/031570, "International Search Report dated", Aug. 26, 2016, 5 Pages.

*Primary Examiner* — Blake C Riddick
(74) *Attorney, Agent, or Firm* — Workman Nydegger

(57) ABSTRACT

A method for calibrating an imaging system can include at least the following method acts: illuminating a sample through a pinhole mask using an excitation light; capturing an image of the sample using a sensor; converting the image into data; in a processing module: filtering the data using a known spacing of pinholes in the pinhole mask to obtain filtered data that corresponds to the known spacing, using a threshold to identify regions of the filtered data that are bright enough to be associated with a pinhole, calculating the centroids of the regions, and fitting a known pattern for the pinhole mask to the regions in order to identify the best fit data for the filtered data; and storing, in a storage medium, the best fit data for use in a subsequent confocal capture routine.

20 Claims, 12 Drawing Sheets

Related U.S. Application Data

(60) Provisional application No. 62/169,675, filed on Jun. 2, 2015.

(52) U.S. Cl.
CPC ..... *G02B 21/0032* (2013.01); *G02B 21/0036* (2013.01); *G02B 21/0044* (2013.01)

(58) Field of Classification Search
USPC .............. 250/336.1, 458.1, 459, 459.1
See application file for complete search history.

(56) References Cited

U.S. PATENT DOCUMENTS

| | | | | |
|---|---|---|---|---|
| 6,307,635 B1* | 10/2001 | Goldberg | ............... | G03F 7/706 356/458 |
| 6,328,213 B1* | 12/2001 | He | ............... | G06K 7/14 235/462.12 |
| 7,115,848 B1 | 10/2006 | Zinter et al. | | |
| 2004/0032650 A1* | 2/2004 | Lauer | ............... | G02B 21/004 359/385 |
| 2005/0006479 A1* | 1/2005 | He | ............... | G06K 7/14 235/462.25 |
| 2005/0031201 A1* | 2/2005 | Goh | ............... | G06T 5/009 382/169 |
| 2005/0082494 A1* | 4/2005 | Motomura | ............... | G02B 21/002 250/458.1 |
| 2005/0280830 A1* | 12/2005 | Rembe | ............... | G02B 21/0056 356/511 |
| 2007/0035734 A1* | 2/2007 | Muller | ............... | G01N 21/31 356/432 |
| 2007/0263226 A1* | 11/2007 | Kurtz | ............... | A61B 5/0059 356/492 |
| 2009/0046298 A1* | 2/2009 | Betzig | ............... | G01N 21/6445 356/521 |
| 2010/0308234 A1* | 12/2010 | Harju | ............... | G01J 3/4406 250/458.1 |
| 2012/0070102 A1* | 3/2012 | Yokokawa | ............... | H04N 5/23222 382/286 |
| 2013/0207007 A1* | 8/2013 | Tanabe | ............... | G01N 21/6458 250/573 |
| 2014/0098369 A1 | 4/2014 | Blasenheim et al. | | |
| 2014/0300624 A1* | 10/2014 | Wyatt | ............... | G09G 3/342 345/600 |
| 2015/0212012 A1* | 7/2015 | Barak | ............... | G02B 21/0016 702/182 |
| 2015/0253557 A1* | 9/2015 | Kalkbrenner | ............... | G02B 21/0032 250/208.1 |
| 2016/0238827 A1* | 8/2016 | Shroff | ............... | G02B 21/0032 |
| 2016/0252718 A1* | 9/2016 | Hartell | ............... | G02B 21/367 382/299 |

FOREIGN PATENT DOCUMENTS

| | | |
|---|---|---|
| JP | 2015-084062 | 4/2015 |
| WO | 2009/001510 | 12/2008 |
| WO | WO-2013/126762 | 8/2013 |

* cited by examiner

SYSTEMS AND METHODS FOR CALIBRATING A STRUCTURED ILLUMINATION IMAGING SYSTEM AND FOR CAPTURING A STRUCTURED ILLUMINATION IMAGE

This application is a continuation of International Patent Application No. PCT/US2016/031570 filed May 10, 2016, which claims the benefit of priority to U.S. Provisional Application No. 62/169,675 filed Jun. 2, 2015, which disclosures are herein incorporated by reference in their entirety.

BACKGROUND

Technical Field

The embodiments described herein are related to fluorescence imaging, and more particularly to generating a composite confocal image in a fluorescence imaging system, without the need for a pinhole mask in the emission path.

Related Art

A fluorescence microscope is a light microscope used to study properties of organic or inorganic substances using fluorescence instead of, or in addition to, reflection and absorption. The fluorescence microscope is based on the phenomenon that certain material emits energy detectable as visible light when irradiated with the light of a specific wavelength. The sample can either be fluorescing in its natural form (like chlorophyll) or it may be treated with a fluorescing stain.

A basic widefield fluorescence microscope that is well known in the art includes a light source and several filters that correspond to a wavelength matching a fluorescence stain. An excitation filter is provided for selecting an excitation wavelength of light from the light source, and a dichroic beamsplitter reflects light from the light source to illuminate the specimen. The illuminated light is separated from the much weaker emitted fluorescence with an emission filter. The fluorescing areas can be observed in the microscope and shine out against a dark background with high contrast.

A structured illumination imaging system uses much the same principle as the widefield imaging system described above, with the key that only a portion of the sample is illuminated at any one time. A large portion of the excitation light is blocked, while a pattern of unblocked illumination is swept over the entire sample such that each area of the sample receives approximately equal excitation light. Typically, multiple images are captured at discrete intervals in this process and a single fully illuminated image is generated by an image processing algorithm which analyzes the discrete input images to construct a corresponding output image. This output image is superior to an image captured using simple widefield imaging techniques due to the reduction in light gathered from out of focus areas of the sample, resulting in improved signal to noise ratio, higher lateral and axial spatial resolution, or both.

A confocal imaging system is a type of structured illumination system. A confocal imaging system can be used to improve the signal to noise ratio or increase the optical resolution. In a confocal imaging system, the objective is to image only the thin part of the sample that is in focus, rejecting all light from above and below the focus plane. This is in contrast to more basic wide-field imaging, where out-of-focus elements still appear as significant elements in the image.

Conventional confocal systems can be divided loosely into single-point confocal and multi-point confocal systems. In single-point confocal systems the illumination used to excite the dye is passed through a pinhole onto the sample, then the fluorescent emission from the sample is passed through another pinhole into a photodetector. The pinhole size and optics are designed to accept light back from only those photons emitted from the thin slice of the sample that is in focus.

The technique can only image one point. Accordingly, the beam or the sample must be scanned back and forth in two dimensions to construct a single 2D confocal image. The beam in such conventional systems is typically scanned over a fixed sample, which requires very fast, very accurate mirrors to be synchronized to the photodetector.

In a multi-point confocal system the operational principle is the same as above but multiple points are imaged in parallel. Typically a disk with a pattern of pinholes is spun such that the illumination is swept over the field of view during an exposure. An example spinning-disk confocal imaging system is illustrated in FIG. 7.

As can be seen in FIG. 7, light 802 from the light source is incident on a first disk 804 that includes a plurality of focusing lenses 806 that focus the light onto a pinhole mask 810 included in a second disk 808. Light 802 passing through pinhole mask 810 is then focused onto the specimen 814 via objective lens 812. The light 802 is absorbed by fluorophores, which causes them to emit light 816, which passes back through objective lens 812 and pinhole mask 810 and is incident on mirror 818. Mirror 818 reflects the emitted light 816 onto a sensor 822, e.g., via optics 820, where it can be detected.

A system such as that illustrated in FIG. 7 can capture images faster than a single-point system but such a system also requires more complex synchronization between pinholes and detectors.

Another issue with such conventional fluorescence imaging system is photobleaching. In such systems, viewing a sample causes the sample to become dimmer over time. This effect, known as photobleaching, is the result of the energy of the excitation light slowly damaging the molecules of the dye and consequently reducing its fluorescent response. This effect is only evident in areas of the sample that have been exposed to excitation light and varies based on the duration and intensity of exposure. It is therefore possible for one area of the sample to be very dim (very photobleached) and another area to be very bright (not at all photobleached) even though there is no appreciable difference in the biology of the sample.

In structured illumination applications this effect can cause qualitative and quantitative problems. The basic concept of structured illumination is to light only a small portion of the sample at a time, then combine multiple partially lit views of the sample into one fully lit view with image processing software. This takes advantage of certain characteristics of light and optics to capture an image that would not be possible with standard wide-field illumination. The sample is typically over-illuminated, so that more area than just the subset of the sample area being imaged at any one time is receiving light. This causes photobleaching in areas of the sample that may not yet have been imaged, so that when they are imaged the apparent brightness is less than it would have been had this area been imaged earlier in the process. When the images are combined, this can cause strong artificial periodic trends in quantitative analysis and visually evident patterns in qualitative analysis.

There are several conventional ways of overcoming this problem. First, the capture settings can be changed as the capture process progresses in order to compensate for the lower brightness due to photobleaching. But this approach requires all elements of the system to be very well quantified with respect to several variables and may need to be calibrated for the individual sample. Second, the brightness of individual images can be adjusted in post-processing to compensate for the decreasing brightness. Third, a more focused illumination source (such as a laser) can prevent much of the over-illumination that causes the extra photobleaching.

SUMMARY

Systems and methods for calibrating a fluorescence imaging system so that the system can be used to generate a structured illumination image without a pinhole mask in the emissions path are disclosed herein.

According to one aspect, a method for calibrating an imaging system comprises: illuminating a sample through a pinhole mask using an excitation light; capturing an image of the sample using a sensor; converting the image into data; in a processing module: filtering the data using known spacing of pinholes in the pinhole mask to obtain data that corresponds to the spacing, using a threshold to identify regions of the remaining data that are bright enough to be associated with a pinhole, calculating the centroids of the regions, and fitting a known pattern for the pinhole mask to the regions in order to identify the best fit for the data; and storing, in a storage medium, the best fit data for use in a subsequent confocal capture routine.

According to another aspect, a fluorescence imaging system comprises: an illumination source configured to illuminate a sample through a pinhole mask using an excitation light; a translation apparatus configured to move the pinhole mask or the sample to a first location; a sensor configured to capture an image of the sample at the first location and convert the image into data; an image processing module configured to: filter the data using known spacing of pinholes in the pinhole mask to obtain data that corresponds to the spacing, use a threshold to identify regions of the remaining data that are bright enough to be associated with a pinhole, calculate the centroids of the regions, fit a known pattern for the pinhole mask to the regions in order to identify the best fit for the data; a storage medium configured to store the best fit data; and a control module configured to use the best fit data to control the illumination source and the translation apparatus in order to obtain a plurality of images of the sample for use in a subsequent confocal capture routine.

According to another aspect, a method for capturing a composite confocal image obtained in a fluorescence imaging system comprises: illuminating a sample through a pinhole mask using an excitation light; moving the pinhole mask or the sample to a first location using a translation apparatus; capturing an image of the sample at the first location; convert the image into data; in an image processing module: filtering the data using known spacing of pinholes in the pinhole mask to obtain data that corresponds to the spacing, using a threshold to identify regions of the remaining data that are bright enough to be associated with a pinhole, calculating the centroids of the regions, fitting a known pattern for the pinhole mask to the regions in order to identify the best fit for the data; storing in a storage medium the best fit data; and in a control module, using the best fit data to control the illumination source and the translation apparatus in order to obtain a plurality of images of the sample for use in a subsequent confocal capture routine.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

In the embodiments described herein, systems and methods for producing a structured illumination image are disclosed. It will be understood that the embodiments described are by way of example only. Moreover, the figures are illustrative and intended to aid the description of the systems and methods disclosed. Thus, the figures may not comprise all of the components, circuitry, elements, etc., needed to depict a complete system. Thus, the figures and the accompanying disclosure should not be viewed as limiting the embodiments to certain configurations, nor should they be viewed as foreclosing the inclusion of further components, etc., in the configurations disclosed, or of further configurations.

As noted above, a structured illumination system has certain advantages over a conventional widefield system. A confocal imaging system is a type of structured illumination system. A confocal imaging system can be used to increase the optical resolution and contrast and enable the reconstruction of three-dimensional structures from a series of obtained images. In a confocal imaging system, the objective is to image only the thin part of the sample that is in focus, rejecting all light from above and below the focus plane. This is in contrast to more basic wide-field imaging, where out-of-focus elements still appear as significant elements in the image.

Conventional confocal systems can be divided loosely into single-point confocal and multi-point confocal systems. In single-point confocal systems the illumination used to excite the dye is passed through a pinhole onto the sample, then the fluorescent emission from the sample is passed through another pinhole into a photodetector, i.e., it is essentially a single pixel camera. The pinhole size and optics are designed to accept light back from only those photons emitted from the thin slice of the sample that is in focus.

The technique can only image one point, i.e., one pixel of an image, at a time. Accordingly, the beam or the sample must be scanned back and forth in two dimensions to construct a single 2D confocal image. The beam in such conventional systems is typically scanned over a fixed sample, which requires very fast, very accurate mirrors to be synchronized to the photodetector.

In a multi-point confocal system the operational principle is the same as above but multiple points are imaged in parallel. Typically a disk with a pattern of pinholes is spun such that the illumination is swept over the field of view during an exposure. An example spinning-disk confocal imaging system is illustrated in FIG. 7.

Figure 7:
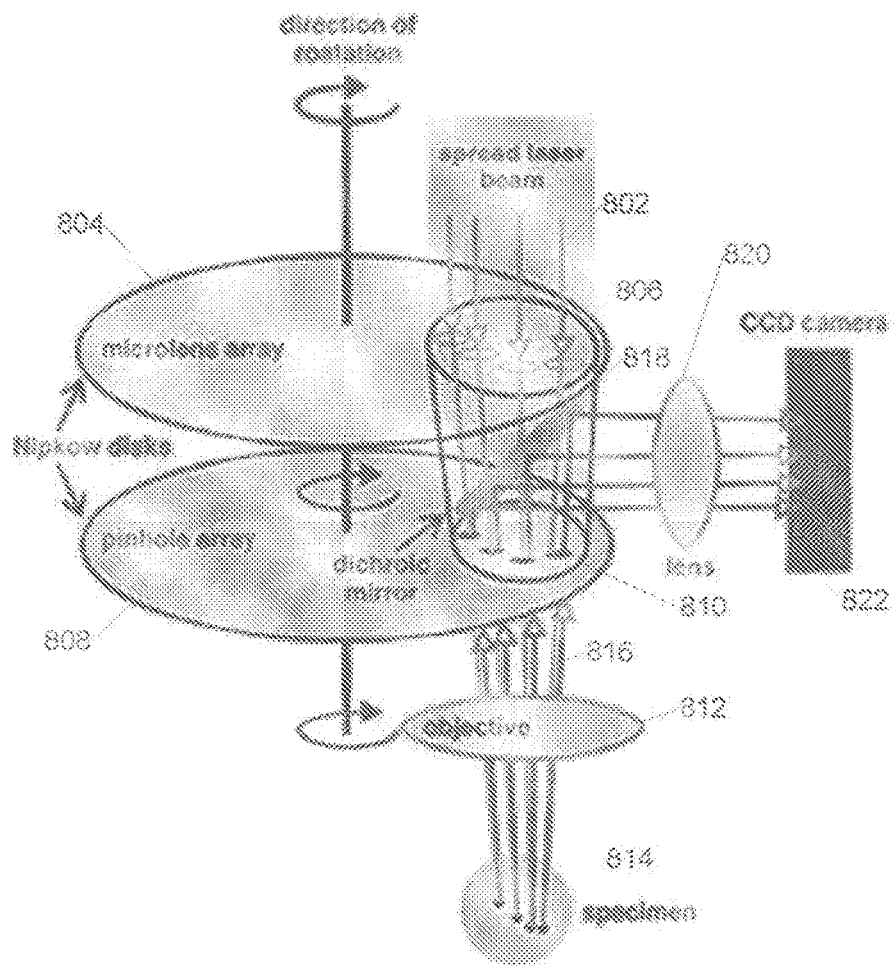
FIG. 7 is a diagram illustrating a conventional spinning-disk confocal imaging system.

As can be seen in FIG. 7, light 802 from the light source is incident on a first disk 804 that includes a plurality of focusing lenses 806 that focus the light onto a pinhole mask 810 included in a second disk 808. Light 802 passing through pinhole mask 810 is then focused onto the specimen 814 via objective lens 812. The light 802 is absorbed by fluorophores, which causes them to emit light 816, which passes back through objective lens 812 and pinhole mask 810 and is incident on mirror 818. Mirror 818 reflects the emitted light 816 onto a sensor 822, e.g., via optics 820, where it can be detected.

A system such as that illustrated in FIG. 7 can capture images faster than a single-point system but such a system also requires more complex synchronization between pinholes and detectors.

Figure 1:
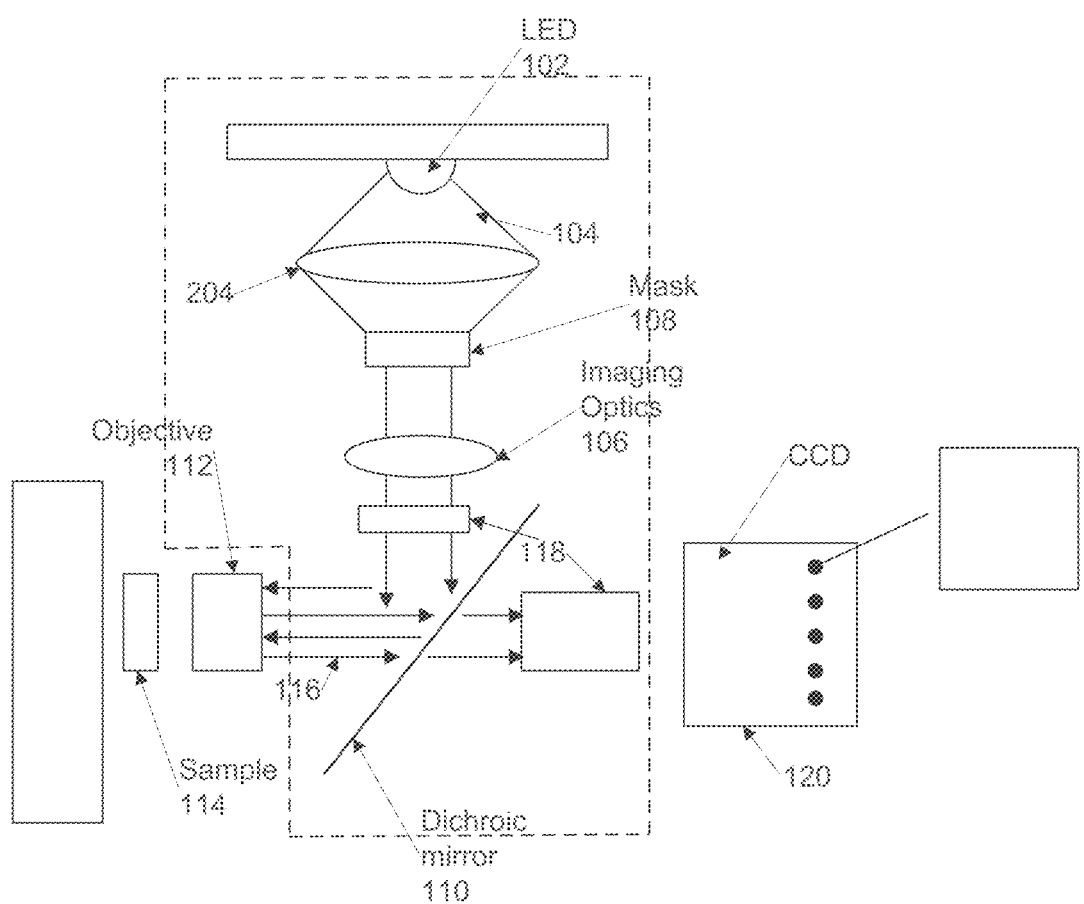
FIG. 1 is a diagram illustrating an example flouresence imaging system configured in accordance with one embodiment.

FIG. 1 is a diagram illustrating an example embodiment of a flouresence imaging system 100 configured in accordance with the system and methods described herein. As can be seen, system 100 comprises a light source 104 configured to produce illumination light 104. The source 102 can for example be a Light Emitting Diode (LED) or a Laser, depending on the implementation. Pinhole optics 106 can then focus light 102 onto a pinhole mask 108. Light passing through mask 108 is then incident on mirror 110, such as a dichroic mirror, which directs the light onto sample 114, e.g., via objective optics 112. The light 104 is absorbed by fluorophores, which causes them to emit light 116, which passes back through objective 112 and mirror 110 an onto sensor 120. A filter 118 can filter the emissions prior the emissions being incident on sensor 120.

It should be noted that in certain embodiments, system 100 can include a pinhole mask in the path of light emissions 116 as in conventional systems; however, as explained in detail below, the emissions path pinhole mask can be eliminated in other embodiments.

Figure 5:
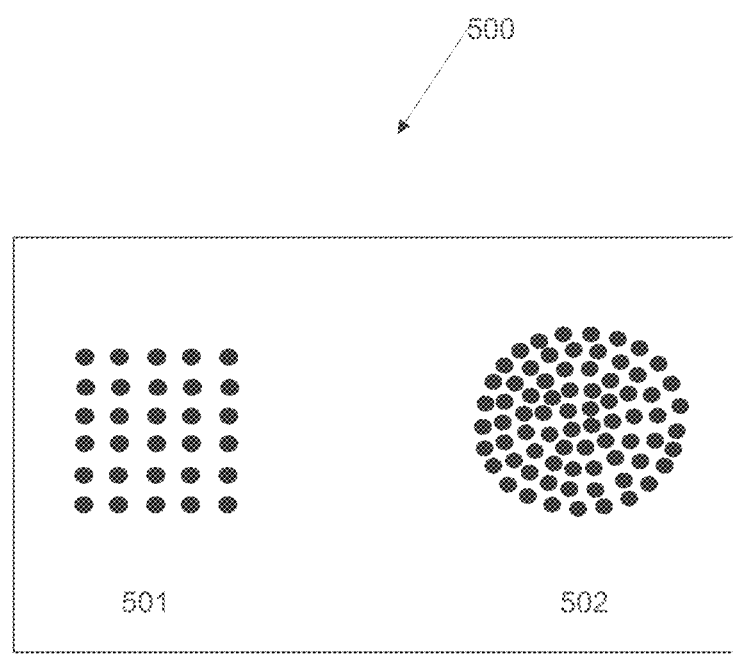
FIG. 5 is a diagram illustrating an example pinhole mask that can be used in the system of FIG. 1, and in particular in the light cube implementation of FIG. 2 in accordance with one embodiment.

Sensor 120 can, e.g., be a Charged Coupled Device (CCD) or CMOS device. Further, the pinhole mask can comprise a predictable pattern that can be defined by a coordinate system, such as a rectangular, square or cylindrical coordinate system. Thus, the mask can be moved in an x-y plane, e.g., as opposed to being rotated on a disk. Although, if a cylindrical coordinate system is used, then the mask can still be spun. FIG. 5 is a diagram illustrating an example mask 500 in accordance with one embodiment. As can be seen, mask 500 can comprise multiple pinhole masks, such as masks 501 and 502.

Figure 2:
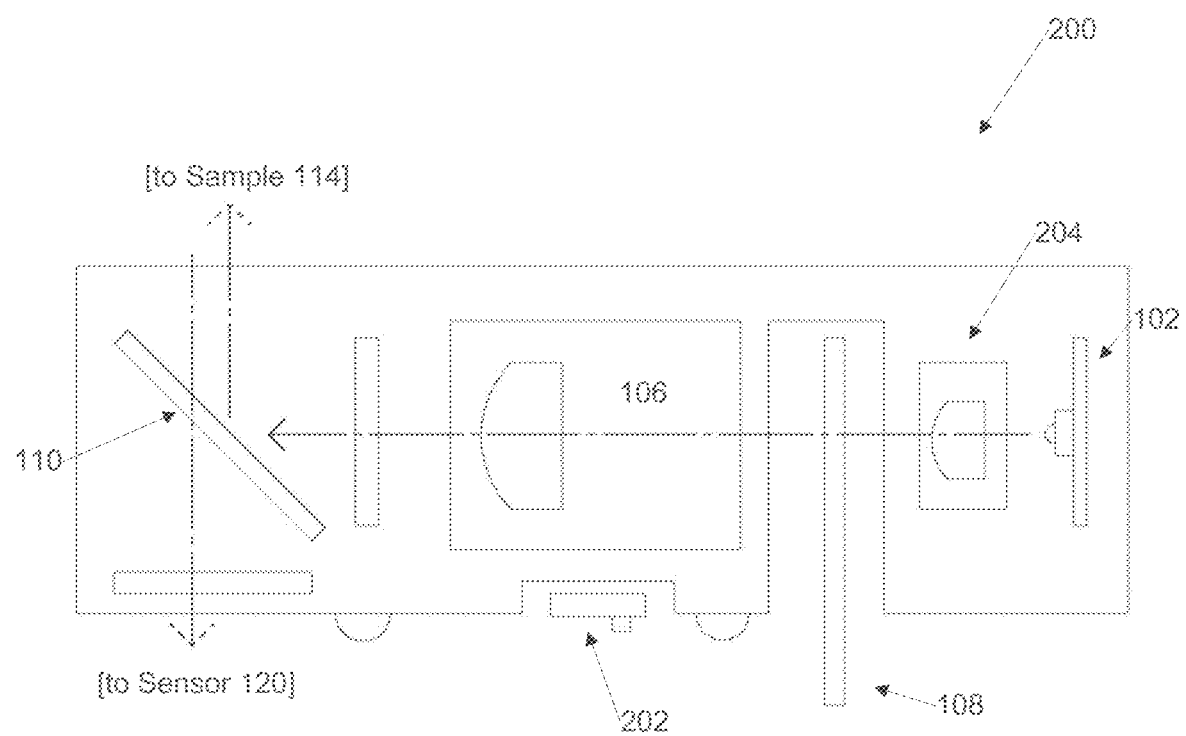
FIG. 2 is a diagram illustrating an example embodiment of a light cube implementation of at least some of the components of FIG. 1.

As illustrated in FIG. 2, the light source 102, imaging optics 106, mask 108, mirror 110 and filter 118 can be included in a very compact light cube 200. The light cube can also include a circuit board 220 that can be configured to communicate with a control system and to control various aspects of the light cube 200. Thus, the mask 500 of FIG. 5 can be configured to be inserted into light cube 200.

As noted above, images captured via conventional systems, such as disk-based raster scanning systems, can include periodic visual artifacts, e.g., such as those caused by photobleaching. While conventional methods for reducing these artifacts can be helpful, system 100 can be configured to reduce the effect of such artifacts by capturing the individual partially illuminated images in a random order each time.

Figure 3:
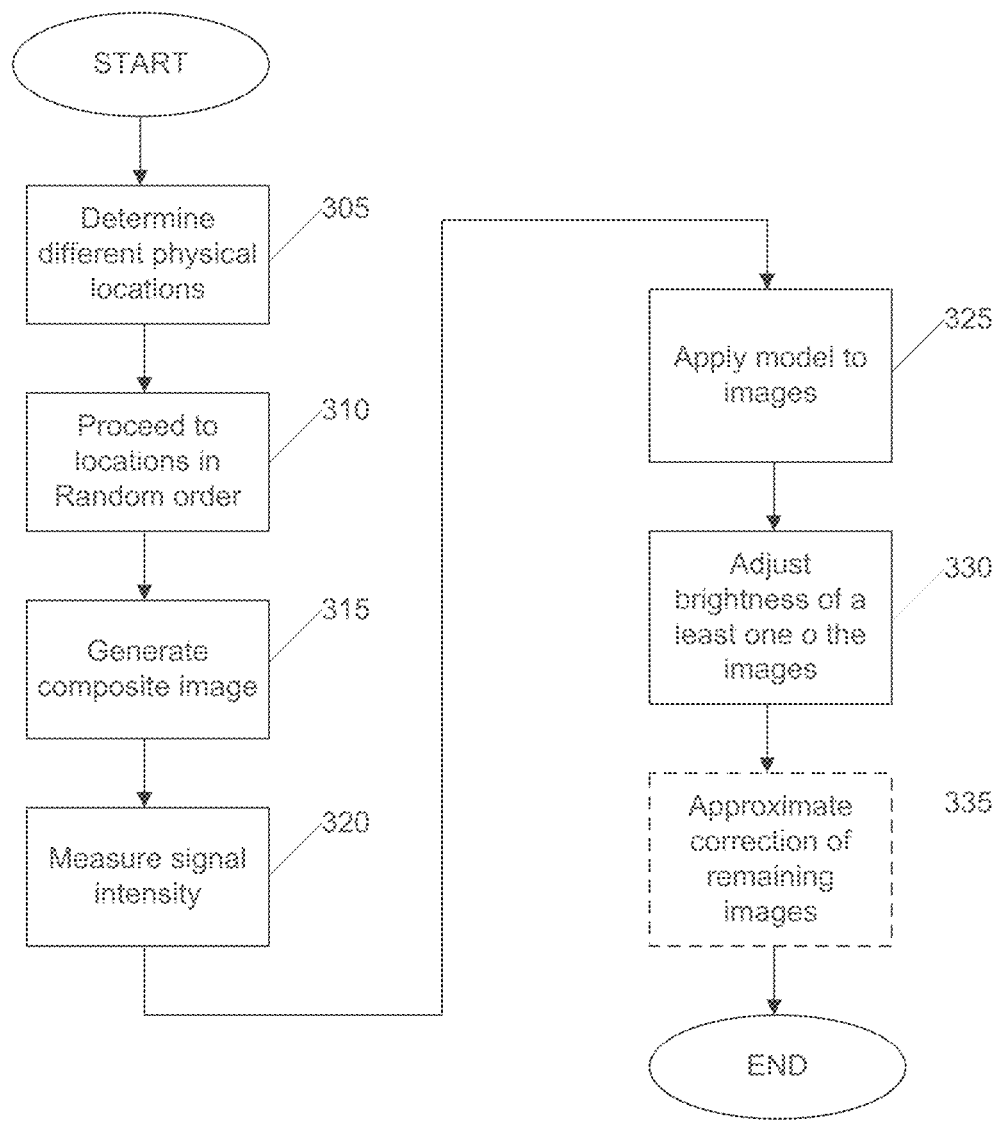
FIG. 3 is a flow chart illustrating an example process for eliminating periodic artifacts such as those produced by photobleaching in images captured using the system of FIG. 1 in accordance with one embodiment.

FIG. 3 is a flow chart illustrating an example process for eliminating periodic artifacts such as those produced by photobleaching. First, in step 305, an image control module 402, e.g., running on a control system 400 can determine the different physical locations that mask 106 must be located in order to properly construct a fully illuminated composite image. Normally, once these positions are determined, the system 400 would then control the translation stage via translation control module(s) 406 to move in a linear fashion, i.e., it would move through each position in order and capture the images. Control module 402 would normally also determine capture settings for each position and control the illumination control 408 in order to capture the images using the capture settings.

But in the embodiment of FIG. 3, the control module 402 causes the translation stage to proceed to each one of the locations in a randomized order and capture the images in step 310. Further, the control module 402 can be configured to cause each image to be captured with the same capture settings each time. This allows for faster individual captures, since the camera or sensor and illumination control do not have to communicate with the control system 400 to confirm new settings before each capture.

Once the images have been captured in step 310, image processing module 404 can be used to generate the composite confocal image in step 315. The image processing module 404 can then be configured to differentiate signal from background information and measure the decrease in signal intensity at discrete steps in the capture process in step 320. A model, such as a curve that has been modeled to match the experimentally observed behavior of photobleaching, i.e., relative brightness as a function of time, can then be fit to the data points in step 325. From that curve, the brightness of all images in the sequence, except the first, can be adjusted in step 330 to eliminate some of the apparent effect of the photobleaching.

It should be noted that the composite image can be generated before or after the model is applied to the images and the brightness of various data points is adjusted.

It should also be noted that rigorously applying the process of FIG. 3 to all images can be computationally intensive and in certain instances would take too long given current processing power constraints. Thus, in certain embodiments, application of the model (step 325) can be applied to just a few images. Approximate correction of the brightness of the remaining images based on the application to a few images can then be performed as illustrated by optional step 335. For example, the model can be applied to an image at the beginning, middle and end of the order and then an exponential decay can be fit to these points. This modified process can result in a relatively quick acquisition of a good quality image.

Figure 4:
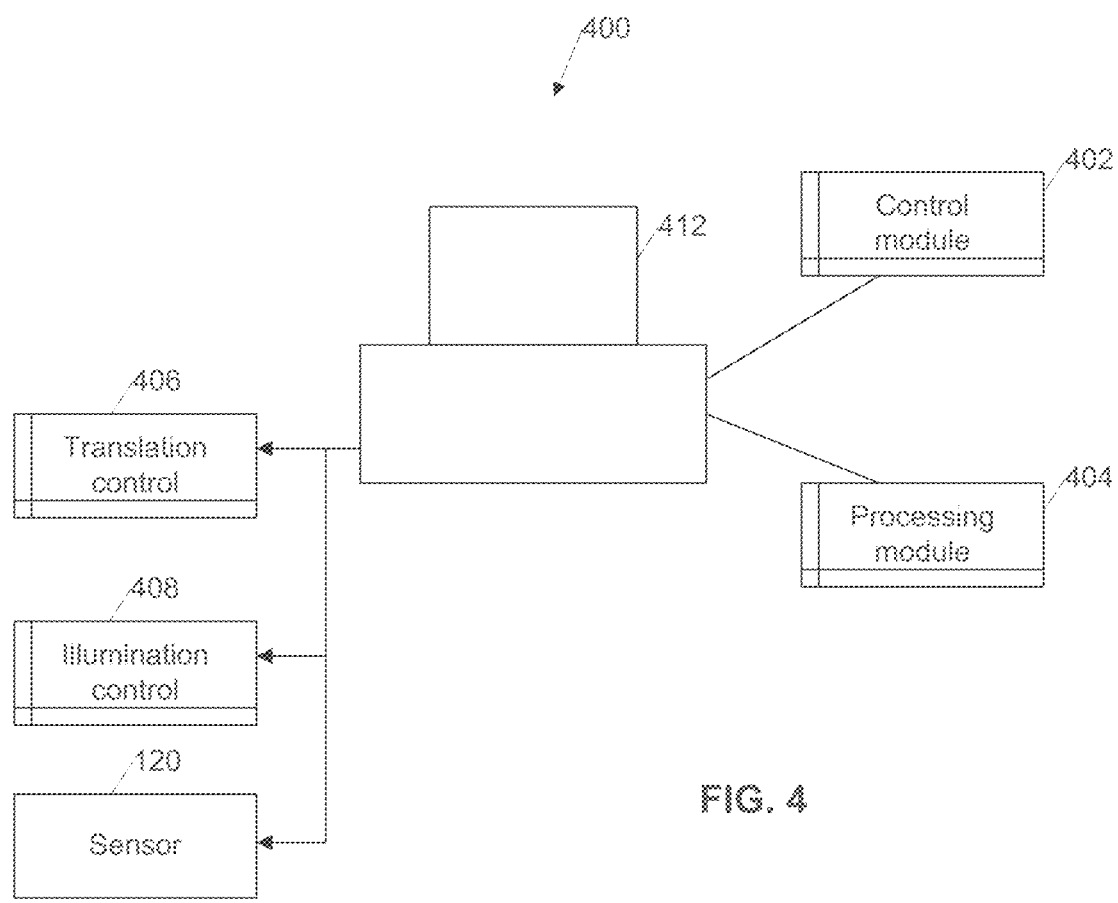
FIG. 4 is a diagram illustrating an example control system for controlling the operation of the illumination system of FIG. 1 in accordance with one embodiment.

FIG. 4 is a diagram illustrating an example control system 400 for controlling the operation of illumination system 100. As can be seen, system 400 comprises an image authority 412. Image authority 412 can comprise all of the resources need to implement certain portions of the system sand methods described herein. Thus, authority 412 can comprise all of the hardware and software resources needed for those portions including one or more processors, including any signal processors, math co-processors, microcontrollers, etc., one or more servers, one or more routers, one or more terminals, one or more computers, including desk top or portable computers, and all the API's, programs, software modules, etc., needed to perform the those portions or aspects of the systems and methods described herein. Thus, a module such as those described herein can comprise the hardware and software resources needed to perform the specified function.

Specifically, authority 412 can comprise various modules configured to control the operation of system 100 and to process data obtained therefrom. As illustrated in FIG. 4, these modules can include an image control module 402, which can be configured to control the translation stages in system 100, e.g., via a translation control module 406. Control module 402 can also be configured to control the illumination via illumination control module 408.

Authority 410 can also comprise a processing module 404 configured to process the image data obtained by sensor 120.

It should be noted that some or all of translation control module 406 and illumination control module 408 can reside within system 100, e.g., within light cube 200 or within the translation stage to which cube 200 is interfaced.

Figure 6A:
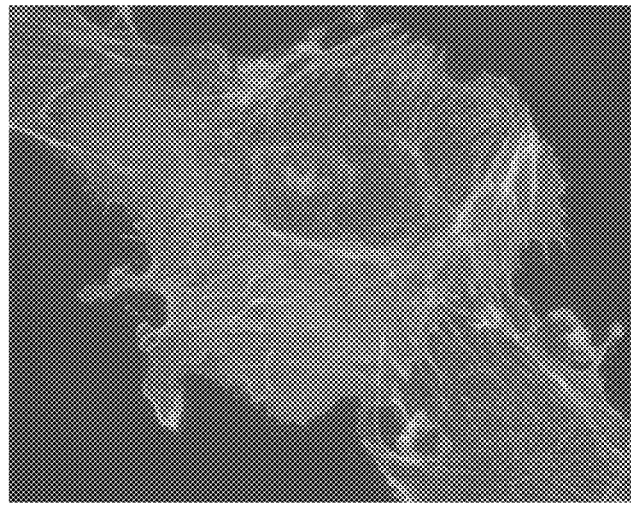
FIG. 6A illustrates an example wide-field image capture.
Figure 6B:
FIG. 6B illustrates a corresponding pin-hole image capture.
Figure 6C:
FIGS. 6C and 6D illustrate a raster scanned confocal image capture.
Figure 6D:
Figure 6E:
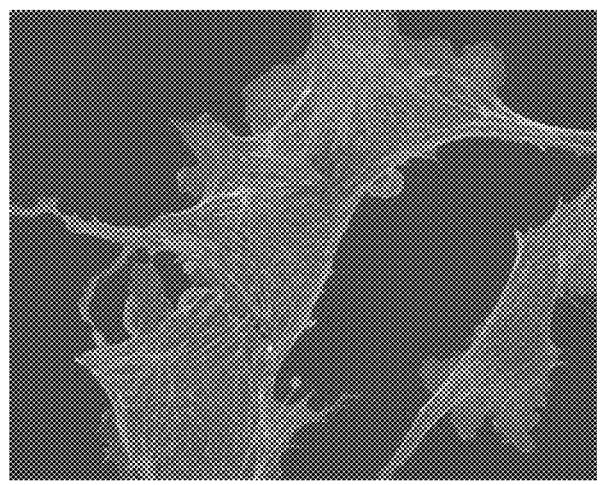
FIGS. 6E and 6F illustrate a randomly scanned image capture performed in accordance with the process of figure.
Figure 6F:
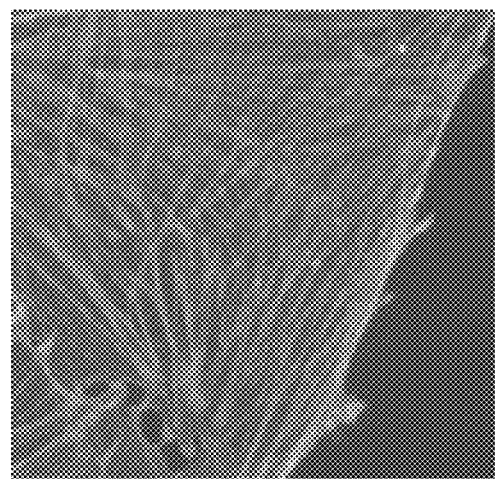

FIGS. 6A and 6B illustrate an example wide-field image capture and a corresponding pin-hole image capture. As can be seen in FIGS. 6C and D, a raster scanned confocal image can provide improved resolution and contrast; however, as illustrated in FIGS. 6E and F, the randomly scanned image capture process of FIG. 3 can provide even better resolution and contrast in less time and with fewer processing resources.

As described above, the systems described herein are multi-point confocal systems. Instead of a spinning disk, as illustrated in FIG. 7, a pattern of pinholes is printed on a small, e.g., glass slide as illustrated in FIG. 5. This slide can be held in front of the excitation light source 102, e.g., as in the light cube configuration of FIG. 2. The mask is moved around using small translation stages which position the mask in the appropriate location to illuminate a different part of the sample before each capture.

Figure 9:
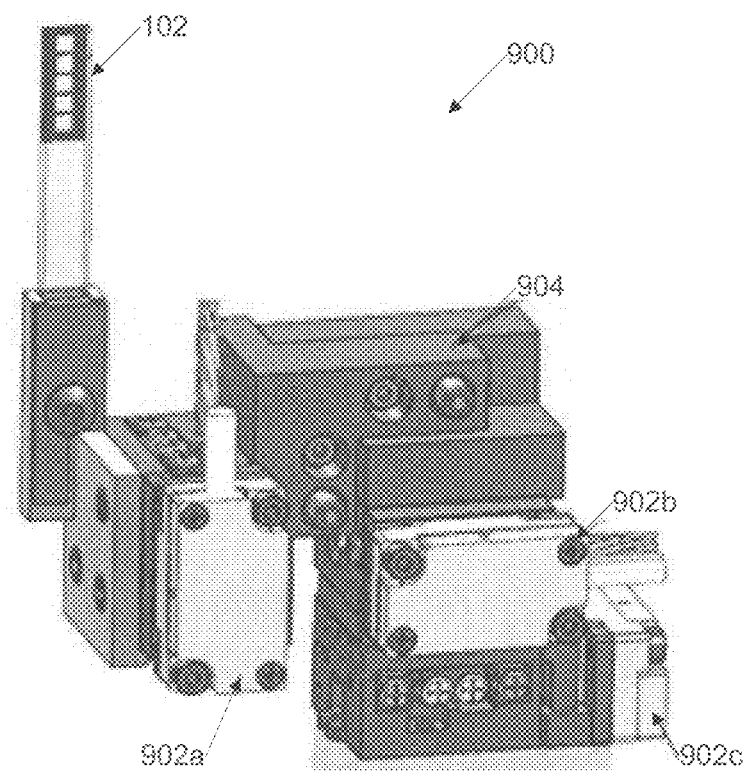
FIG. 9 is a diagram illustrating an example translation apparatus that can be used with the system of FIG. 1, and in particular the light cube of FIG. 2 in accordance with one embodiment.

FIG. 9 is a diagram illustrating an example configuration of the translation apparatus 900, including a plurality of translation stages 902a, b, and c as well as tip/tilt adjustment mechanism 904 in accordance with one embodiment. As can be seen, the translation stages 902 and the tip/tilt adjustment mechanism 904 can move and position the mask 108, e.g., under the control of control module 402 and translation control 406. This type of translation apparatus 900 in addition to the light cube 200 provides a simple and compact solution that allows for several different pinhole patterns, e.g., 501 and 502, to be printed on each slide. This allows for more flexibility, giving the user a choice between speed and quality.

Additionally, as noted above, in certain embodiments, the systems and methods described herein can be configured to eliminate the need for a pinhole mask on the emission path. Instead, the systems and methods described herein can be configured to use a high resolution sensor 120, such as a CCD or CMOS device, to virtually mask off the returned image, only recording data in the 'good' regions of the image. For system 100 to know the location of the good data, the locations of the pinholes 108 relative to the sensor 120 must be known. This is accomplished by taking a calibration image at the beginning of the confocal capture routine and using image processing, e.g., within processing module 404 to determine the location of the pinhole array 108 relative to the sensor 120. In this way the system is at least partially self-calibrating and can tolerate small errors in image-to-image system positioning, such as the position of a light cube 200, without significant loss of image quality.

Figure 10:
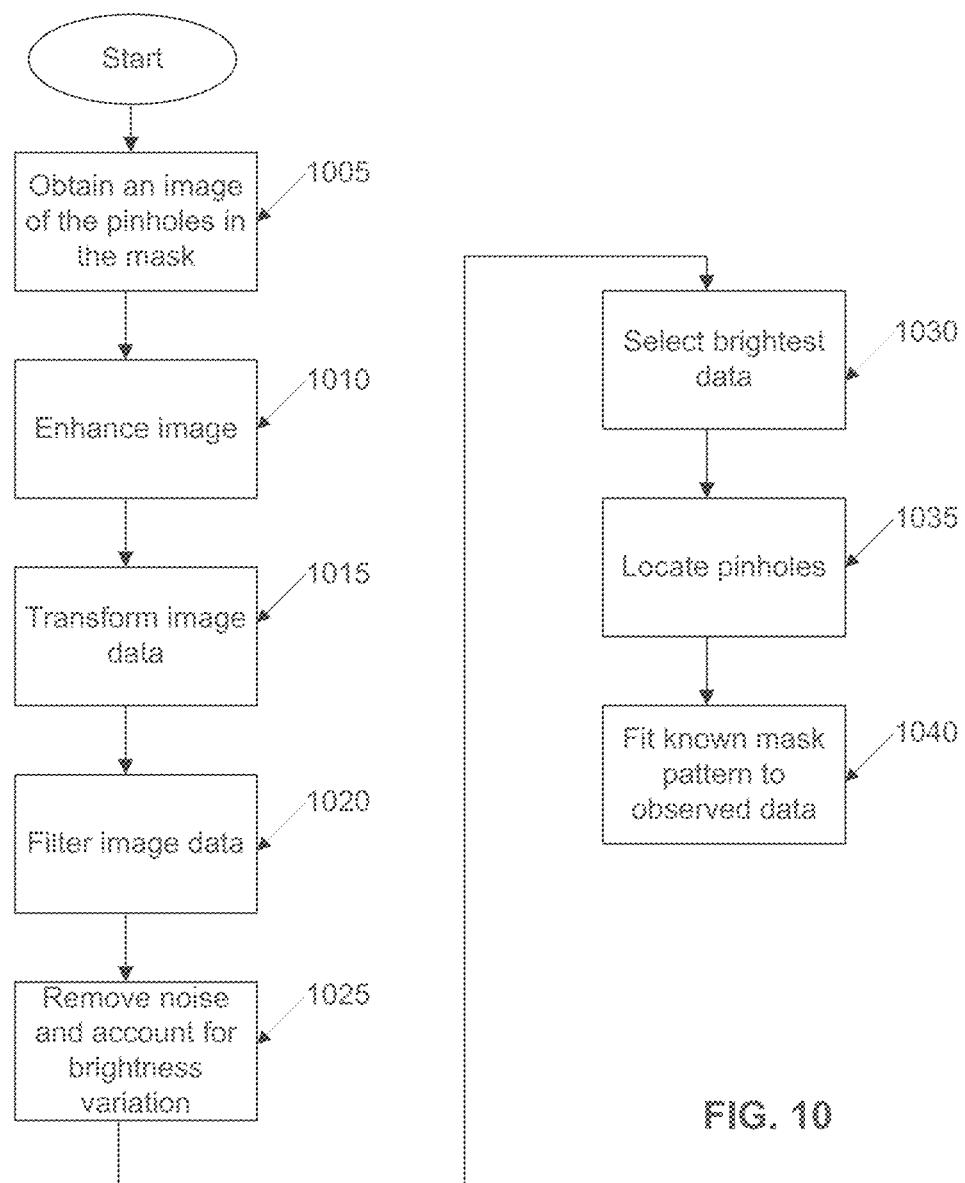
FIG. 10 is a diagram illustrating an example method for calibrating the system of FIG. 1 in order to eliminate the need for a emissions path pinhole mask in accordance with one embodiment.
Figure 11A:
FIG. 11A shows the determined positions of the pinholes for an image.

In essence, the pinholes, i.e., the bright spots in the image of FIG. 11A, are identified and then the data from these locations are processed to generate a confocal image, while data outside these regions is ignored. The process that can be used to establish the location of the pinhole array relative to the camera sensor has several discrete steps as illustrated in FIG. 10. First, in step 1005, an image of the pinholes in the mask can be obtained. Then, in step 1010, various image processing techniques can be used to enhance the image of the mask to make it more suitable for quantitative analysis. Because the spacing of the pinholes is a known quantity, e.g., to processing module 404, a Fourier transform can be used to move the data into the frequency domain, in step 1015, where a bandpass filter can be used, in step 1020, to find data that corresponds with that spacing.

Noise can then be removed and brightness variation across the image accounted for in step 1025. For example and opening technique can be used in step 1025. The brightest data can then be selected in step 1030. For example, a histogram binning technique can be used to keep only the brightest of this data. At this point, the pinholes in the enhanced image can be located in step 1035. For example, a threshold algorithm can be applied that identifies regions of signal that are bright enough to be considered pinholes. The centroids of these regions can then be calculated and stored for use in the next step.

Next, in step 1040, the known mask pattern can be fit to the observed data, thereby relating the mask position to the sensor. For example, a Random Sample Consensus (RANSAC) method can be used to apply and test a variety of rotation, scale and offset factors to the known mask pattern against two centroids at a time. This iterative process can be parallelized to allow the testing of hundreds of possibilities in seconds or less. Once the best fit is determined, the mask pattern is stored for use in the subsequent confocal capture routine.

Because the entire process of FIG. 10 can be completed in a matter of seconds, while running on, e.g., a consumer grade computer it is possible and practical to run this calibration before each confocal capture. Further, since multiple pinholes are imaged at once, the system 100 can capture a high resolution image without the time penalty that would be incurred on a single-point system. Still further, compared to a spinning disk system the translating mask approach eliminates the problems of blurring and vibration since the pinholes are stationary during image captures.

Figure 11B:
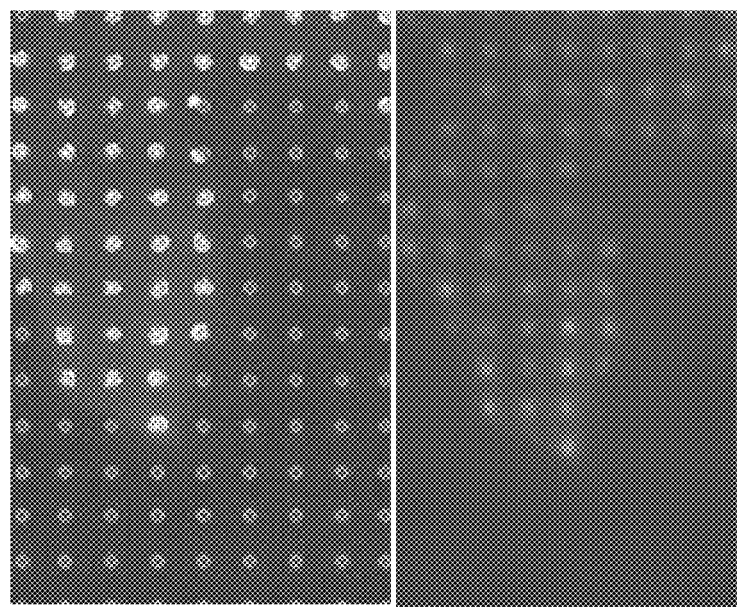
FIG. 11B shows a close-up of a portion of the image with the determined positions overlaid versus the raw data.

FIG. 11A illustrated data captured for an image with the determined pinholes overlaid, wherein the pinhole locations where determined using the process of FIG. 10. FIG. 11B illustrates a close-up of the determined pinholes versus the raw data on the right.

Figure 8:
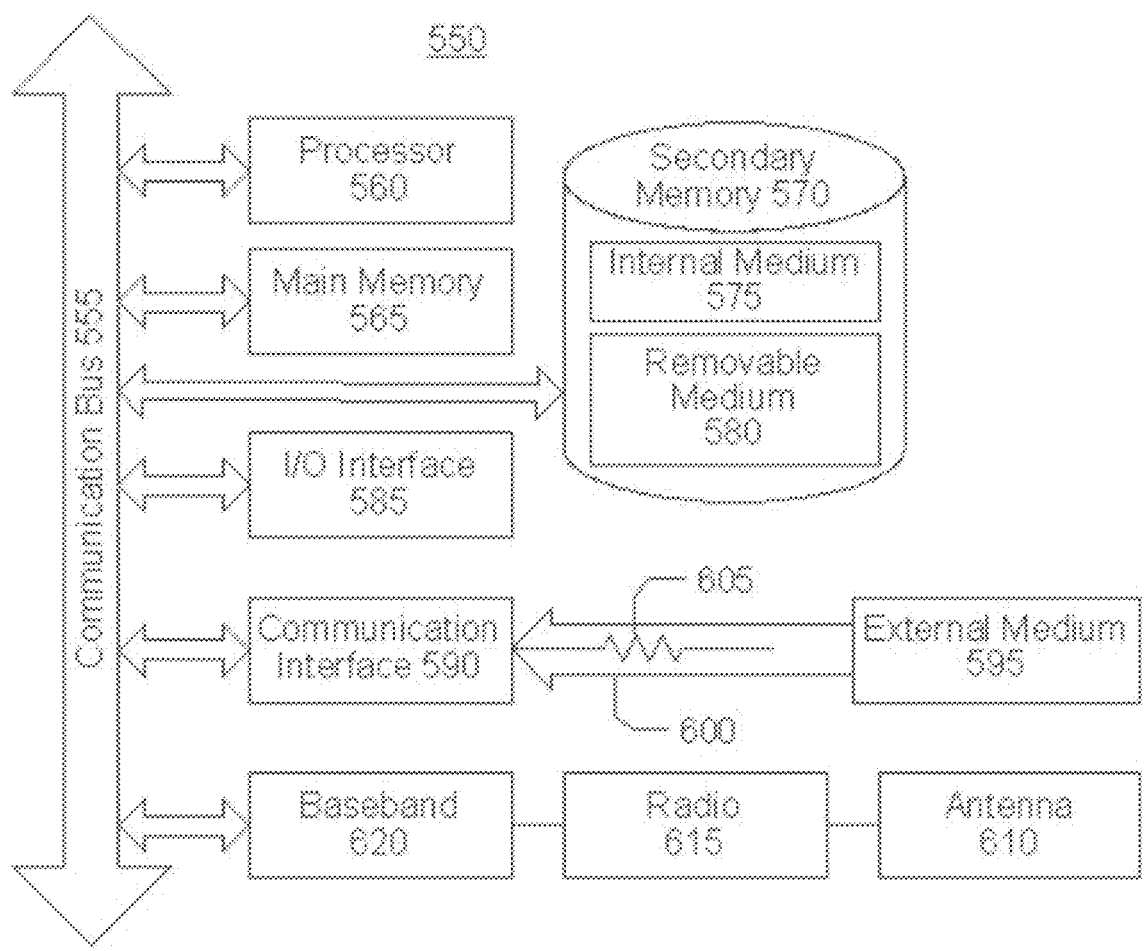
FIG. 8 is a block diagram illustrating an example wired or wireless system that can be used in connection with various embodiments described herein.

FIG. 8 is a block diagram illustrating an example wired or wireless system 550 that can be used in connection with various embodiments described herein. For example the system 550 can be used as or in conjunction with one or more of the mechanisms or processes described above, and may represent components of system 100 or 400, the corresponding server(s), and/or other devices described herein. The system 550 can be a combination of one or more of the following: a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

The invention claimed is:

1. A method for calibrating an imaging system, comprising:
   positioning a pinhole mask at a first location using a translation apparatus;
   illuminating a sample through the pinhole mask using an excitation light;
   capturing an image of the sample using a sensor, the image comprising emission light captured on an emission light path, wherein the emission light path is different than an excitation light path comprising the pinhole mask;
   converting the image into data;
   in a processing module:
      filtering the data using a known spacing of pinholes in the pinhole mask to obtain filtered data that corresponds to the known spacing,
      using a threshold to identify regions of the filtered data that are bright enough to be associated with a pinhole,
      calculating the centroids of the regions, and
      fitting a known pattern for the pinhole mask to the regions in order to identify best fit data for the filtered data with respect to locations of the pinholes; and
   storing, in a storage medium, the best fit data for use in calibrating the imaging system for a subsequent confocal capture routine.

2. The method of claim 1, further comprising, in the processing module, enhancing the data corresponding to the captured image, wherein enhancing the data comprises boosting the sharpness and contrast of the data.

3. The method of claim 1, wherein filtering the data comprises transforming the data to a frequency domain and applying a bandpass filter to the transformed data.

4. The method of claim 1, further comprising, in the processing module, removing noise and accounting for brightness variation in the filtered data.

5. The method of claim 4, further comprising, in the processing module, keeping only the filtered data that exceeds a brightness threshold.

6. The method of claim 5, wherein a histogram binning technique is used to identify the filtered data that exceeds the brightness threshold.

7. The method of claim 1, further comprising positioning the pinhole mask at a second location after capturing the image of the sample at the first location of the pinhole mask.

8. An imaging system, comprising:
   an illumination source configured to emit an excitation light along an excitation path and to illuminate a sample through a pinhole mask positioned on the excitation path between the illumination source and the sample;
   a translation apparatus configured to move the pinhole mask to a first location;
   a sensor positioned on an emission light path and configured to capture an image of the sample at the first location and convert the image into data, the emission light path being different than the excitation light path comprising the pinhole mask;
   an image processing module configured to:
      filter the data using a known spacing of pinholes in the pinhole mask to obtain filtered data that corresponds to the known spacing,
      use a threshold to identify regions of the filtered data that are bright enough to be associated with a pinhole,
      calculate the centroids of the regions, and
      fit a known pattern for the pinhole mask to the regions in order to identify best fit data for the filtered data with respect to locations of the pinholes;
   a storage medium configured to store the best fit data for use in calibrating the imaging system for a subsequent confocal capture routine; and
   a control module configured to control the illumination source and the translation apparatus in order to obtain a plurality of images of the sample.

9. The system of claim 8, wherein the image processing module is further configured to enhance the data corresponding to the captured image, wherein enhancing the data comprises boosting the sharpness and contrast of the data.

10. The system of claim 8, wherein filtering the data comprises transforming the data to a frequency domain and applying a bandpass filter to the transformed data.

11. The system of claim 8, wherein the image processing module is further configured to remove noise and account for brightness variation in the filtered data.

12. The system of claim 11, wherein the image processing module is further configured to keep only the filtered data that exceeds a brightness threshold.

13. The system of claim 12, wherein the image processing module is further configured to apply a histogram binning technique to identify the filtered data that exceeds the brightness threshold.

14. The system of claim 8, wherein the translation apparatus is further configured to move the sample to any of a plurality of locations.

15. A method for capturing a composite confocal image obtained in an imaging system, comprising:
- illuminating a sample through a pinhole mask using an excitation light emitted from an illumination source;
- moving the pinhole mask to a first location using a translation apparatus;
- capturing an image of the sample at the first location, the image comprising emission light captured on an emission light path without a pinhole mask in the emission light path;
- converting the image into data;
- in an image processing module:
  - filtering the data using a known spacing of pinholes in the pinhole mask to obtain filtered data that corresponds to the known spacing,
  - using a threshold to identify regions of the filtered data that are bright enough to be associated with a pinhole,
  - calculating the centroids of the regions, and
  - fitting a known pattern for the pinhole mask to the regions in order to identify best fit data for the filtered data with respect to locations of the pinholes;
- storing in a storage medium the best fit data for use in calibrating the imaging system for a subsequent confocal capture routine; and
- in a control module, controlling the illumination source and the translation apparatus in order to obtain a plurality of images of the sample.

16. The method of claim 15, further comprising, in the image processing module, enhancing the data corresponding to the captured image by at least boosting the sharpness and contrast of the data.

17. The method of claim 15, wherein filtering the data comprises transforming the data to a frequency domain and applying a bandpass filter to the transformed data.

18. The method of claim 15, further comprising, in the image processing module, removing noise and accounting for brightness variation in the filtered data.

19. The method of claim 15, further comprising, in the image processing module, keeping only the filtered data that exceeds a brightness threshold.

20. The method of claim 15, further comprising moving the sample using the translation apparatus; and capturing a subsequent image after moving one or both of the pinhole mask or the sample to a second location.

* * * * *